No. 614,317. Patented Nov. 15, 1898.
C. L. BEVINS.
CONNECTING ATTACHMENT FOR BICYCLES.
(Application filed Mar. 15, 1897.)

(No Model.) 2 Sheets—Sheet 1.

Witnesses
Harry O. Robinson
Arthur J. Randall

Inventor
Charles L. Bevins
by B. J. Hayes
atty

THE NORRIS PETERS CO., PHOTO-LITHO., WASHINGTON, D. C.

No. 614,317. Patented Nov. 15, 1898.
C. L. BEVINS.
CONNECTING ATTACHMENT FOR BICYCLES.
(Application filed Mar. 15, 1897.)
(No Model.) 2 Sheets—Sheet 2.
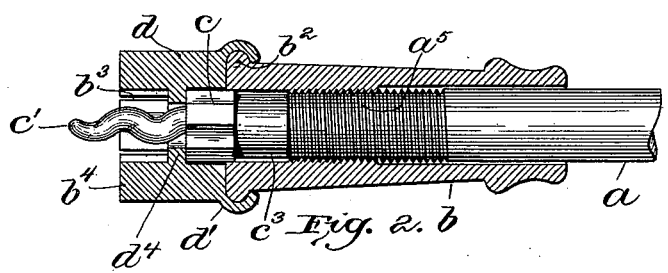
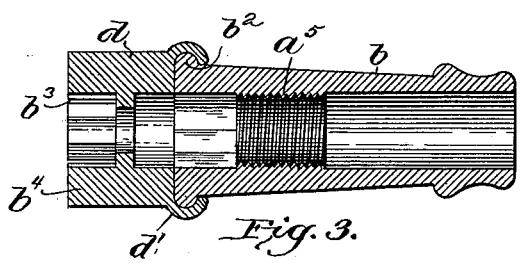
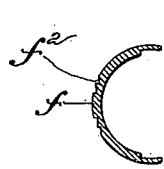
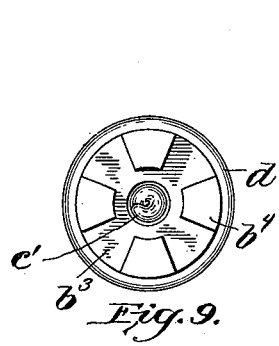
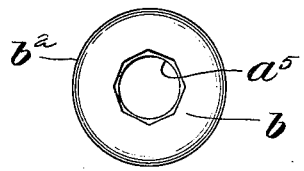
Witnesses: Inventor:

UNITED STATES PATENT OFFICE.

CHARLES L. BEVINS, OF NEWPORT, RHODE ISLAND.

CONNECTING ATTACHMENT FOR BICYCLES.

SPECIFICATION forming part of Letters Patent No. 614,317, dated November 15, 1898.

Application filed March 15, 1897. Serial No. 627,449. (No model.)

*To all whom it may concern:*

Be it known that I, CHARLES L. BEVINS, of Newport, county of Newport, State of Rhode Island, have invented an Improvement in Connecting Attachments for Bicycles, of which the following description, in connection with the accompanying drawings, is a specification, like letters on the drawings representing like parts.

This invention has for its object to improve and simplify the construction of connecting devices for bicycles, whereby two machines, either ladies' or gentlemen's, or both, may be connected together; and the invention consists in details of construction to be hereinafter pointed out and claimed.

Figure 1:
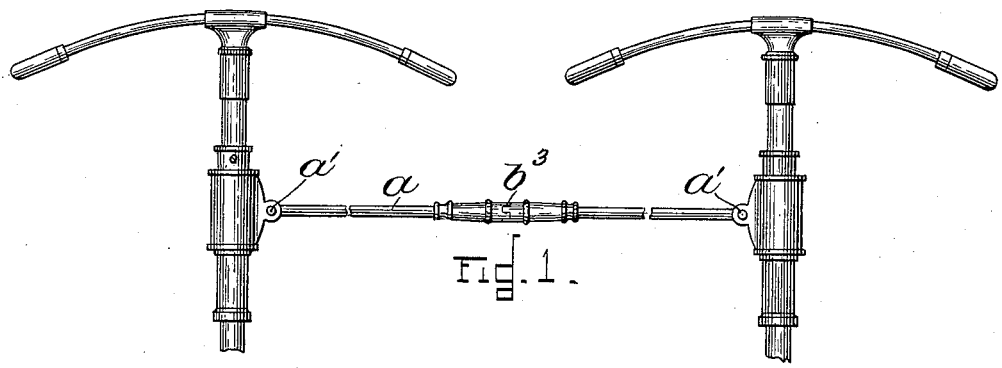
Figure 4:
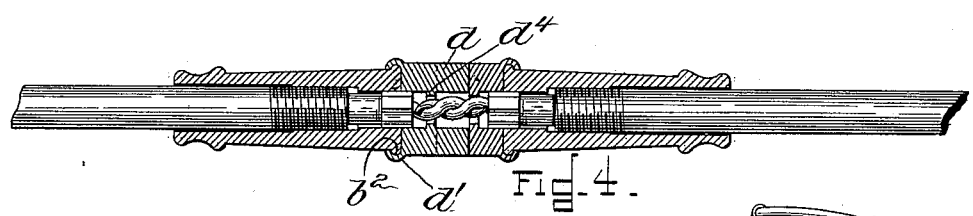
Figure 5:
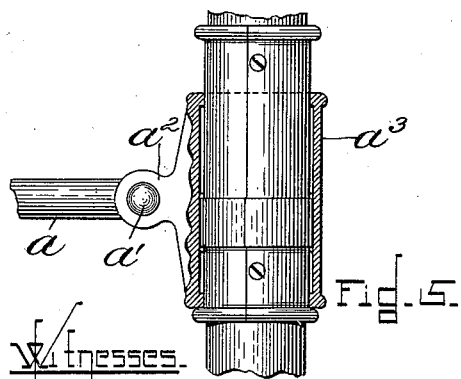
Figure 8:
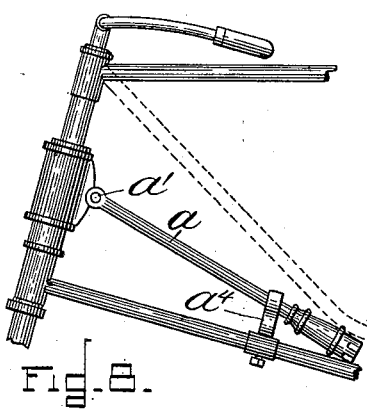

Figure 1 shows in front elevation the upright front frames of two bicycles and a pair of connecting attachments therefor connected or coupled together; Fig. 2, a longitudinal section of one of the connecting attachments; Fig. 3, a longitudinal section of the same with certain of the parts removed; Fig. 4 a longitudinal section of a pair of connecting attachments shown connected together—as, for instance, when two machines are coupled or connected together; Fig. 5, a side view of a sleeve mounted upon the upright frame at the front of the machine to which the connecting or coupling bar of my improved attachment is pivotally connected; Figs. 6 and 7, details of said sleeve and means for securing it in place on the upright front frame; Fig. 8, a side elevation of the frame of a bicycle having my improved connecting attachment thereon; Fig. 9, an end view of the connecting attachment shown in Fig. 2; Fig. 10, an end view of the hand-nut hereinafter referred to.

The attachments on both machines will be made alike, and hence but one will be described.

The connecting-bar $a$ is pivoted at one end at $a'$ to an ear $a^2$, formed on and projecting laterally from a sleeve $a^3$, which is mounted upon the upright frame at the front of the machine, and said sleeve $a^3$ is adapted to turn on said upright frame, as will be hereinafter described, in such a manner that the connecting-bar may be extended or swung into different positions to connect it with a machine at either side of the one upon which it is mounted, and when not in use to be swung rearward into a plane with the frame of the machine, as shown in Fig. 8. When not in use, said connecting-bar will be held securely by means of a pair of spring clips or jaws $a^4$ on the frame. (See Fig. 8.)

The outer end of the connecting-bar $a$ is screw-threaded, as at $a^5$, and receives upon it an interiorly-screw-threaded hand-nut $b$, which is made of a size and length and shape to be engaged by hand and to be turned in either direction, as desired, to thereby shift it longitudinally on said bar.

The hand-nut $b$ projects a short distance beyond the end of the connecting-bar $a$, and within said projecting end it is provided with a chamber, formed octagonal in cross-section, adapted to receive within it the octagonal head $c$ of a spiral screw $c'$ and to also accommodate a cylindrical portion $c^3$, which projects from said head in a direction opposite the spiral screw.

The cylindrical portion $c^3$ of the spiral screw $c'$ abuts against the end of the connecting-bar $a$, and as said spiral screw is thus held against longitudinal movement in one way by bearing against the end of the connecting-bar it will be seen that by turning said hand-nut in one direction the latter will be shifted or retracted on the screw-threaded portion $a^5$, and the spiral screw will be caused to project or protrude therefrom more or less.

One member or section of a coupling is swiveled upon the end of the hand-nut $b$, and said member is herein shown made as a short hollow cylinder $d$, having an annular flange $d'$, which engages an annular flange $b^2$ on the end of the hand-nut, by means of which it is swiveled to the said hand-nut, and said coupling member or section is formed on its opposite face with projections $b^4$ and interdental spaces $b^3$, so that the coupling member which is swiveled on the end of one connecting-bar will engage and mesh with a similar coupling member on any other connecting-bar similarly constructed or adapted to receive it.

The swiveled coupling member $d$ is made hollow to receive within it and permit the passage therethrough of the spiral screw $c'$, so that the latter will be free to rotate and to be moved longitudinally therein as the hand-nut is turned.

When the parts are not in use, the hand-nut and swiveled coupling member or section thereon will be advanced so far as to entirely inclose the spiral screw $c'$; but when in use the spiral screw $c'$ will be caused to project or protrude a considerable distance. (See Fig. 2.)

An annular flange $d^4$ is formed or provided upon the interior of the coupling member and said flange serves to prevent the spiral screw from slipping out or falling through it.

When it is desired to connect two machines together, their attachments will be brought into alinement, and the two coupling members or sections will be brought together and caused to engage each other by the projections on each entering the interdental spaces of the other, as shown in Figs. 1 and 4, and then the hand-nuts $b$ will be turned, thereby revolving the spiral screws contained therein, and as each of said nuts is retracted or shifted along the connecting-bar on which it is mounted toward the machine to which the connecting-bar is attached the spiral screws will be uncovered or caused to protrude and at the same time rotated, so that they will be brought into locking engagement with each other. (See Fig. 4.)

To disconnect the connecting attachments, the hand-nuts will be shifted on the bars $d$ in the opposite direction by contrary motion of said nuts, and the opposite effect to that just above described will be produced.

The spiral screws $c'$ $c'$ constitute a locking device for the bars $a$ $a$, and as they are made alike and each borne by one of the bars it will be seen that any bar having such a coöperative part of a locking device may engage a like part on any other bar.

The sleeve $a^3$ is applied to the upright front frame of a machine in the following manner: Two plates $f f$, semicircular in cross-section, are secured to the upright front frame, and the side edges of said plates are made to overlap each other, and said overlapping edges are riveted or otherwise secured together.

The exterior of each semicircular plate $f$ is formed or provided with a narrow annular raised portion in which are formed a number of vertically-arranged grooves $f^2$, which when the plates are in position are preferably located diametrically opposite each other, as shown in Fig. 6. The sleeve $a^3$ is also made in two semicircular halves or sections, which have overlapping edges adapted to be secured together, as by rivets $a^4$, and the interior of each semicircular half or section is formed with vertical projections $a^5$, adapted to be slid into and caused to engage said vertical grooves in the plates $f f$.

The inner plates $f f$ are rigidly secured to the upright front frame by any suitable means—as, for instance, the fastenings $f^3$—by means of which the overlapping ends are secured together and may be projected into said upright front frame. The said plates are also formed or provided upon their exterior at each end thereof with beads or raised portions for maintaining the sleeve $a^3$ in position on said plates.

The two-part sleeve $a^3$ is free to slide up and down on the inner plates $f f$ to thereby slide the projections $a^5$ into and out of the grooves $f^2$, and when said sleeve is raised sufficiently to be disengaged from said inner plates it is free to be turned in either direction, as may be desired. Thus it will be seen that when said sleeve $a^3$ is in its lowermost position the grooves and projections will be in engagement and the sleeve will be locked in engagement with the inner plates and cannot be turned, and when it is slid into its uppermost position the projections will be withdrawn from the grooves and it will be free to be turned. By this particular means of applying the sleeve $a^3$ it can be made to fit any of the different sized upright front frames; but it is obvious that the notched plates $f f$ may be formed integral with said upright front frames, if desired.

I claim—

1. A connecting device for bicycles comprising two like parts, each consisting of a connecting-bar loosely connected to the upright front frame of a bicycle to be extended from either side thereof, and a coöperative part of a locking device at the outer end of said bar consisting of a spiral screw, and an operating device therefor, substantially as described.

2. A connecting device for bicycles comprising a pair of bars, a locking device connecting the adjacent ends thereof, composed of two like coöperative parts, one on each bar, and sleeves to be applied to the frame of the bicycle free to turn on the upright front frame of the bicycle, substantially as described.

3. A connecting device for bicycles comprising two like parts each consisting of a connecting-bar loosely connected at one end to the frame of the machine, and having its opposite end screw-threaded, a hand-nut thereon, a coupling member swiveled to said hand-nut and a spiral screw borne by said nut, substantially as described.

4. A connecting device for bicycles comprising two like parts each consisting of a connecting-bar having a coupling device at one end, a vertically-movable sleeve to which the opposite end of said bar is pivoted, having projections upon the interior thereof, and a second sleeve on which said first-mentioned sleeve is mounted secured to the upright front frame, and having grooves formed upon its exterior adapted to engage the projections on the first-mentioned sleeve, substantially as described.

In testimony whereof I have signed my name to this specification in the presence of two subscribing witnesses.

CHARLES L. BEVINS.

Witnesses:
DANIEL WATSON,
GEORGE H. BEVINS.